US008510472B1

United States Patent
Anderson et al.

(10) Patent No.: US 8,510,472 B1
(45) Date of Patent: Aug. 13, 2013

(54) PRESENCE-BASED MECHANISM TO INCLUDE VISITING ASSOCIATES IN LOCATION-SPECIFIC EMAIL DISTRIBUTION LISTS

(75) Inventors: Jeffrie D. Anderson, Arvada, CO (US); Robert D. Burnham, Idaho Springs, CO (US); Brijen Doshi, Thornton, CO (US); Susan K. Love, Broomfield, CO (US); John V. Rishea, Denver, CO (US); John M. Swanagon, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 956 days.

(21) Appl. No.: 11/862,384

(22) Filed: Sep. 27, 2007

(51) Int. Cl.
 *G06F 12/00* (2006.01)
(52) U.S. Cl.
 USPC .......................... 709/245; 709/206; 709/223
(58) Field of Classification Search
 USPC .......... 709/223, 204–206, 245; 715/753–759
 See application file for complete search history.

(56) References Cited

U.S. PATENT DOCUMENTS

| | | | |
|---|---|---|---|
| 6,545,596 B1 * | 4/2003 | Moon ........................ | 340/425.5 |
| 6,912,398 B1 | 6/2005 | Domnitz | |
| 7,895,278 B2 * | 2/2011 | Hamilton et al. ............. | 709/206 |
| 8,019,821 B2 * | 9/2011 | Hamilton et al. ............. | 709/206 |
| 2002/0138580 A1 | 9/2002 | Al-Kazily et al. | |
| 2003/0083046 A1 * | 5/2003 | Mathis ......................... | 455/412 |
| 2003/0119540 A1 * | 6/2003 | Mathis ......................... | 455/518 |
| 2007/0050456 A1 * | 3/2007 | Vuong et al. .................. | 709/206 |
| 2008/0034042 A1 * | 2/2008 | Costea et al. ................. | 709/206 |
| 2008/0095336 A1 * | 4/2008 | Tysowski et al. ........... | 379/88.22 |
| 2008/0104075 A1 * | 5/2008 | Heumesser .................... | 707/7 |
| 2008/0148276 A1 * | 6/2008 | Kerr et al. ..................... | 719/313 |
| 2008/0263638 A1 * | 10/2008 | McMurtry et al. ................ | 726/4 |
| 2008/0281699 A1 * | 11/2008 | Whitehead ..................... | 705/14 |
| 2008/0301184 A1 * | 12/2008 | Sussmeier et al. .......... | 707/104.1 |
| 2009/0182820 A1 * | 7/2009 | Hamilton et al. ............. | 709/206 |
| 2011/0055344 A1 * | 3/2011 | Hamilton et al. ............. | 709/206 |

* cited by examiner

*Primary Examiner* — Kenneth R Coulter
(74) *Attorney, Agent, or Firm* — Sheridan Ross P.C.

(57) ABSTRACT

The present invention provides methods, devices, and systems for managing message distribution lists. More specifically, the message distribution list may be location-specific and the recipients listed in the list may be dynamically updated based on their detected presence with respect to a particular location. By dynamically updating a message distribution list based on presence information, recipients of the message can be provided with a greater assurance that the messages they receive are locally relevant.

26 Claims, 5 Drawing Sheets

PRESENCE-BASED MECHANISM TO INCLUDE VISITING ASSOCIATES IN LOCATION-SPECIFIC EMAIL DISTRIBUTION LISTS

FIELD OF THE INVENTION

The invention relates generally to communication systems and more particularly to electronic messaging systems.

BACKGROUND

Two of the most commonly used applications for delivering electronic messages to individuals and groups are electronic mail (email) and text messages. Email refers to the transmission of messages, which may include further messages and/or files as attachments, by computer from one person to another person or group of persons. Email provides expedient connectivity and fast communication between network users. If a person is either unavailable or unwilling to pick up a message immediately, the message is stored until that person can review the stored message at a later time. Email messages also provide a quick and easy way to package information such as sales reports, graphics, and other data for transfer to another user or group of users by simply attaching the information to the message. Business users increasingly rely on email messages to share ideas, transmit documents, schedule meetings, and perform a multitude of other everyday tasks.

Text messages are similar to email message in that they are text based and can be electronically sent from one user to a plurality of other users. Text messages such as Short Message Service (SMS) messages and Instant Messages (IM) use different applications and often times help facilitate real time communications whereas traditional email is a non-real time communication medium.

Emails in large corporations and other organizations are often times targeted to an audience in a specific location. Such emails may contain information specific to the targeted location. For example, some employees working in an organization and at a particular location may receive an email pertaining to a fire drill that will be conducted at that location on a specific date, or a message indicating that a parking lot near the location will be closed for a particular amount of time.

When associates within that organization from another location come to that targeted location they may desire to receive such emails, even though they do not have a permanent office at that location. Conversely, an associate that has a permanent office at the targeted location may be away on business or vacation. Under such circumstances the associate may not desire to receive such location specific emails.

One way to address this issue is for the "visiting associate" to ask someone at the relevant location to forward location-specific distribution list messages to them during their visit. This solution assumes that the visiting associate knows someone at the location who would be willing to perform this service and that the person to whom the request is made would remember to forward the relevant messages to the requestor.

Another solution would be for the visiting associate to request of the mail server administrator that they be added to the location-specific distribution list(s). This is problematic in that the administrator must manually add the user to the relevant list(s) and then remember to remove them when the visiting associate departs.

There is also prior art that detects the presence of mobile device users and broadcasts advertising from local stores to the user's mobile device when they are within a certain range of the local store. This solution has no concept of a pre-existing distribution list or the idea of automatically adding "visitor" entities to that pre-existing list.

Another possible solution is described in U.S. Patent Application No. 2002/0138580 to Al-Kazily et al., the entire contents of which are hereby incorporated herein by this reference. The Al-Kazily reference describes a locator system that allows messages already originally intended for a user to be directed to the most convenient receiving device for that user based on the user's location. The Al-Kazily reference does not however provide for adding the user to a location-specific message distribution list based on the user's presence activity.

SUMMARY

These and other needs are addressed by various embodiments and configurations of the present invention. The present invention is directed generally to a system, device, and method for facilitating a location-specific message distribution list, such as an email or text message distribution list. The method generally comprises:

receiving presence information regarding presence activity of a first user in a first location;

determining that the first location comprises a first electronic message group address associated therewith; and updating a dynamic portion of the first electronic message group address with the received presence information.

The group address of the present invention may correspond to a location-specific distribution list. The group address may include a listing of recipients that are to receive electronic messages associated with the first location. In accordance with at least some embodiments of the present invention, the dynamic portion of the group address may contain a listing of recipients whose presence has recently been detected at the first location. Additionally, the group address may comprise a static portion that contains a listing of recipients whose default or home location is registered as the first location. When a message is sent having the group address as an identified recipient, then recipients in the dynamic and/or static portion of the group address may receive the electronic message being sent.

As can be appreciated by one skilled in the art, the electronic message may correspond to an email message, an SMS message, an IM message, a voice message, a video message, or any other type of message which can be digitized and transmitted electronically across a communication network.

The use of a group address having a dynamic portion which can be updated based on user presence information allows the distribution of location-specific messages to be more accurately targeted to recipients which may be interested in receiving such messages. More specifically, since the electronic messages are transmitted based on presence information, users will have the option to not receive location-specific messages when they are not at a particular location. On the other hand, users visiting a particular location will have the option of being provided with such messages as long as they are at the particular location.

The dynamic portion of the group address may be updated based on affirmative presence activity and/or negative presence activity. More specifically, the presence of a user does not necessarily have to be detected at a location to have a group address associated with that location be adjusted. For example, if the presence of a user is detected at one location then it may safely be assumed that the user is not at a second location if the first and second locations are geographically separated. Based on this inference, group addresses associated with the second location can be updated just as easily as group addresses associated with the first location.

The term "presence information" as used herein should be understood to include any type of data that represents either the positive or negative presence of a person or element within a particular location of interest or at a particular device of interest. Presence information can be ascertained by using geographical and proximity location techniques as well as monitoring the user activity at a particular electronic device whose location is know. Presence information may also be obtained without detecting any sort of user activity, for example by referencing a user's electronic calendar to determine where the use anticipates to be at a particular point-in-time. Other known presence detection methods may also be employed in accordance with at least some embodiments of the present invention.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before perfoimance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to manage location-specific message distribution lists.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or co-located on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
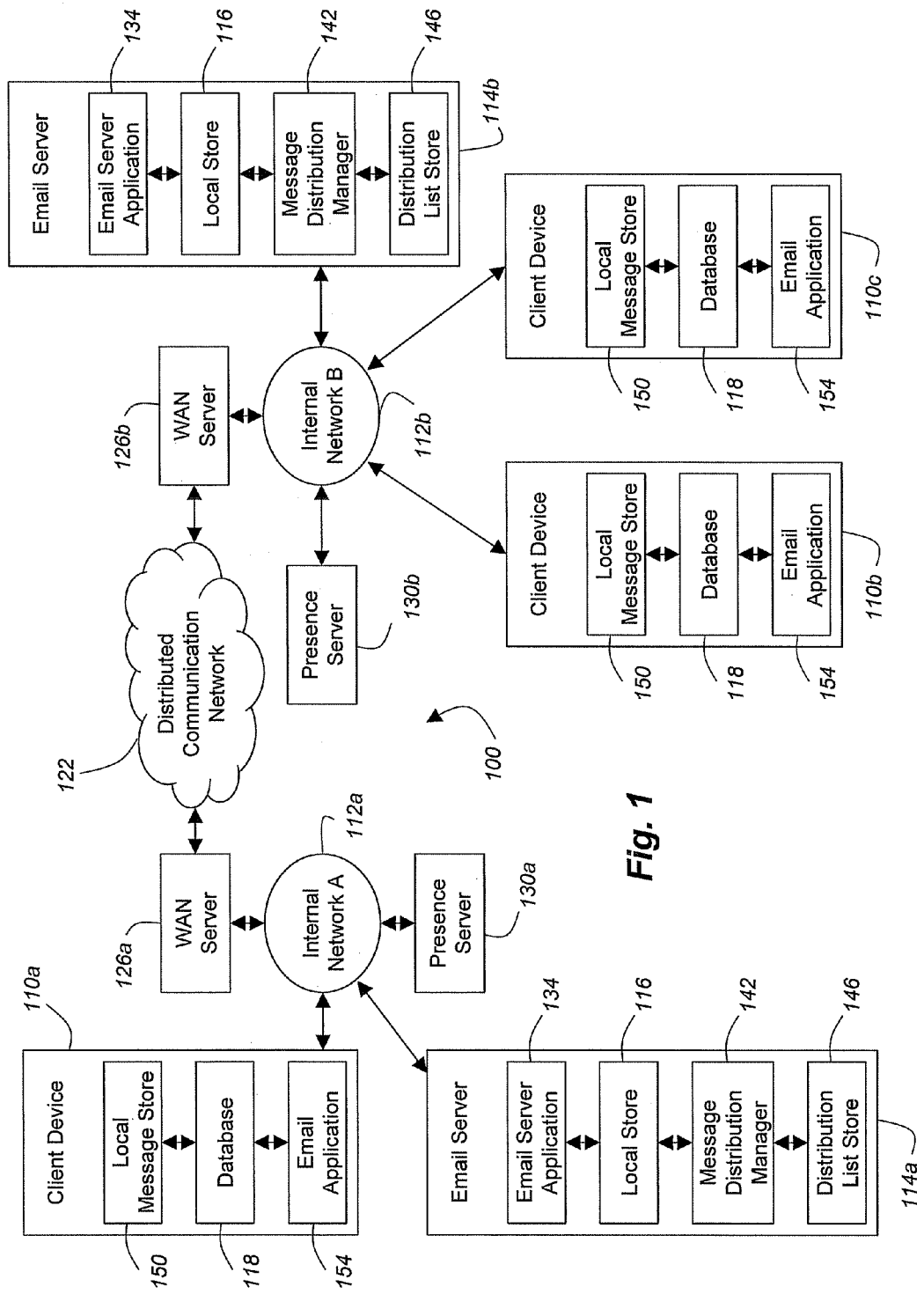
FIG. 1 is a block diagram of a communication system in accordance with embodiments of the present invention.

With reference to FIG. 1, a communication system 100 will be described in accordance with at least some embodiments of the present invention. The communication system 100 may comprise one or more client devices or clients 110a, 110b, 110c operable to communicate with one another via electronic messages transmitted across the distributed communication network 122. The client devices 110a, 110b, 110c may comprise any type of computing device comprising a processor and memory. Examples of typical client devices 110a, 11b, 110c include, but are not limited to, personal computers, laptop computers, Personal Digital Assistants (PDAs), portable electronic message retrieval devices, phones, cellular phones, IP phones, and the like.

The first client device 110a may be connected to a first server computer ("server") 114a, which is typically a Local Area Network or LAN server (hereinafter referred to as LAN server) through a first internal network 112a. In typical applications, the first server 114a stores files, such as electronic messages (e.g., email, SMS messages, IM messages, and the like) that are available to other client devices connected to or otherwise associated with the LAN. For example, an email server 114a manages message traffic and mail boxes for users. To obtain information from the first server 114a, the client 110a makes a request for a file or information located on the server 114a using a specified protocol. As will be appreciated, the Internet uses a message standard, known as a Simple Mail Transfer Protocol (SMTP), which works in conjunction with a user's email application 154 and defines the control messages used by two computers to exchange e-mail messages. Upon reception of a properly formatted request, the first server 114a downloads the file or information from a server store 116 to a database 118 located at the first client 110a. The first server 114a is connected to a distributed communication network 122, such as the Internet, typically via the first internal network 112a and a first Wide Area Network or WAN server 126a, such as an Internet Service Provider, and enables the first client 110a to communicate via the distributed communication network 122 with other computational components (e.g., second 110b and third 110c client devices). As will be appreciated, the first WAN server 126a provides translation facilities or gateways that allow message exchange between different types of email programs or applications using different messaging protocols and includes a message store for holding messages until delivery.

The first client 110a communicates via the combination of the first LAN server 114a, one or more WAN servers 126a, 126b, and the distributed communication network 122 to another LAN server 114b, such as a communication or an email server. As shown, a WAN network server 126 is typically located between the distributed communication network 122 and each LAN server 114. The second LAN server 114b is connected to a second internal network 112a and enables the first client 110a to communicate with other clients 110b and 110c. The second and third clients 110b, 110c respectively, can send information to the first client 110a via the second internal network 112b to the second LAN server 114b. The second LAN server 114b, in turn, forwards the information to the client 110a via the associated WAN server(s) 126a, 126b and the distributed communication network 122. The information is retrieved by the first LAN server 114a and can be forwarded to the first client 110a, when requested by the first client 110a.

Each LAN server 114a and 114b and client 110a, 110b, and 110c may include a variety of software components. Specifically, servers 114a and 114b may each include an email server application 134 (such as UNIX mail, Groupwise™ by Novell, and/or Microsoft Exchange™ by Microsoft Corporation), a local (central) message store 116 operable to store email messages and other types of electronic messages, a message distribution manager 142 operable to receive information about messages in the local store 116 and notify a client that an email message intended for the client 110 has been received by the server 114. The message distribution manager 142 may also be operable to dynamically update message distribution lists 146 maintained on the email server 114a, 114b. The message distribution manager 142 may retrieve presence information from one or more presence servers 130a, 130b, which are also associated with the internal networks 112a, 112b. Based on the presence information retrieved from the presence servers 130a and/or 130b, the message distribution manager 142 may be operable to determine what users should be assigned to a particular group address in the distribution list store 146.

The clients 110a, 110b, and 110c may each include a local message store 150 containing one or more queues of notification messages from the message distribution manager 142, a database 118 for archiving full text electronic messages and storing draft messages composed at the client, an email application 154 for interfacing with the email server application 134 and providing a graphical user interface (GUI) for reading and composing messages at the client 110. In accordance with at least some embodiments of the present invention, the client email application 154 is employed by a user to select one or more message distribution lists stored in the distribution list store 146 and send the message to recipients contained therein.

Figure 2:
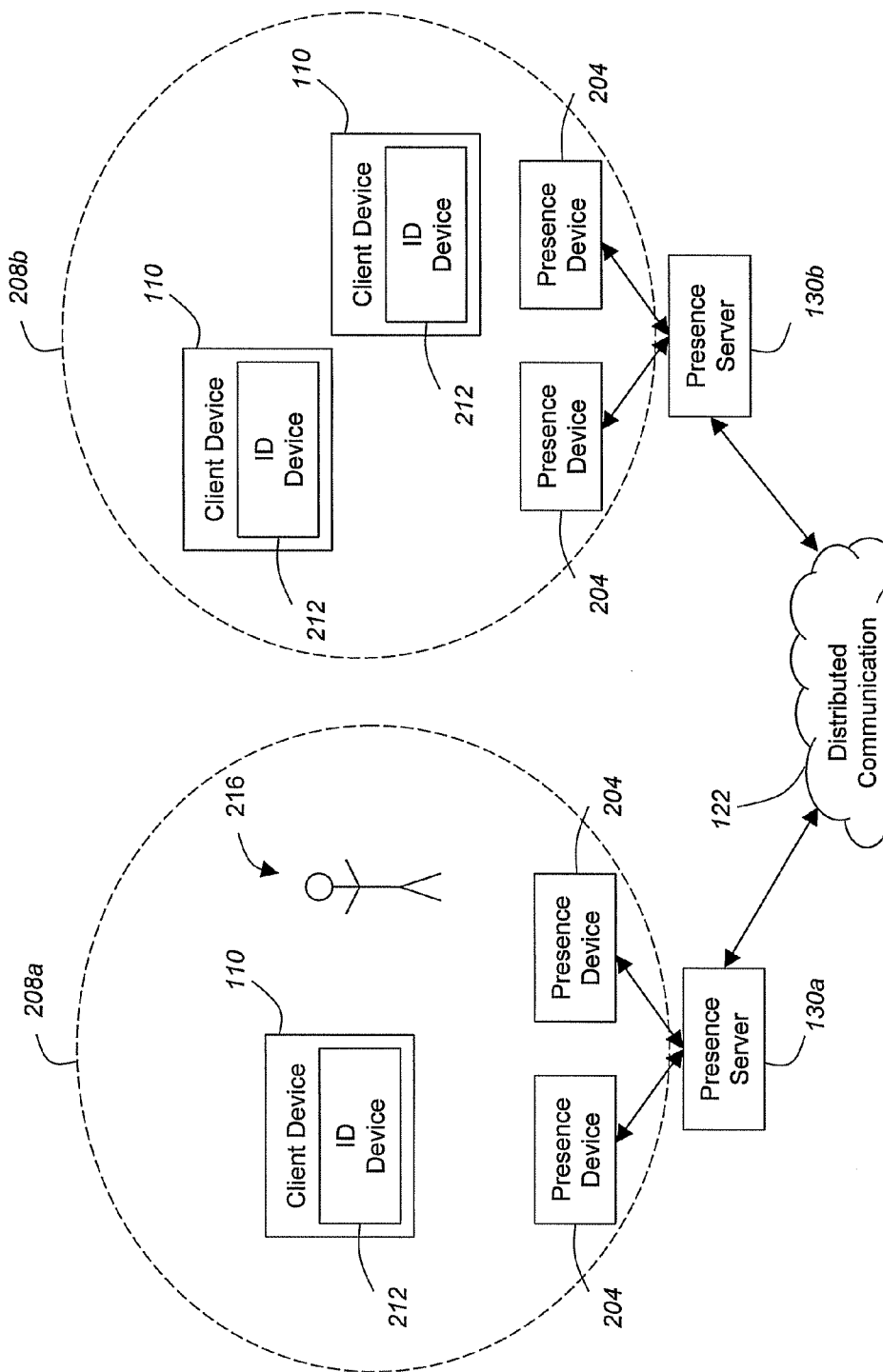
FIG. 2 is a block diagram of a presence detection system in accordance with embodiments of the present invention.

FIG. 2 depicts a presence aware network in accordance with at least some embodiments of the present invention. The presence aware network may be used in connection with the communication network 100. The presence network includes one or more presence detection devices 204 in communication with the presence servers 130a, 130b. A first set of presence detection devices 204 may be used in connection with a first location 208a and a second set of detection devices 204 may be used in connection with a second location 208b The first set of presence devices 204 may be used to affirmatively detect the presence of a user 216 either directly or by a client device 110 associated with the user 216 in the first location 208a. Similarly, the second set of presence devices 204 may be used to affirmatively detect the presence of a user 216 either directly or by a client device 110 associated with the user 216 in the second location 208b.

The presence detection devices 204 may be operable to detect the presence of a user 216 by detecting an identification credential on the user 216. Alternatively, the user 216 may carry a client device 110 that comprises an ID device 212 thereby allowing the presence detection device 204 to detect the presence of the client device 110. Technologies that may be employed by the presence detection device 204 include, but are not limited to, Radio Frequency Identification (RFID) technologies, bar code scanning technologies, optical identification technologies, bioauthentication technologies, as well as devices operable to monitor the presence of a user 216 based on their use of a particular client device 110 or application.

In operation, when the presence of a user 216 is detected in the first location 208a by one of the presence detection devices 204, the presence information is forwarded to the corresponding first presence server 130a. The affirmative presence of the user 216 is registered at the first presence server 130a. Moreover, the presence information may be transmitted from the first presence server 130a to the second presence server 130b via the distributed communication network 122. Upon receiving the affirmative presence information from the first presence server 130a, the second presence server 130b may register negative presence information for the second location 208b. The negative presence information helps ensure that the user 216 whose presence was detected at the first location 208a can receive messages specific to the first location 208a and not unnecessarily receive messages specific to the second location 208b.

In a similar fashion, when the presence of a user 216 is detected in the second location 208b by one of the presence detection devices 204 associated therewith, the presence information is forwarded to the second presence server 130b. The affirmative presence of the user 216 is registered at the second presence server 130b. This presence information may then be transmitted from the second presence server 130b to the first presence server 130a via the distributed communication network 122. Upon receiving the affirmative presence information from the second presence server 130b, the first presence server 130a may register negative presence information for the first location 208a.

Although presence servers 130a, 130b are depicted as being separately associated with a particular location 208a, 208b (e.g., separate internal networks 112a, 112b), one skilled in the art will appreciate that a central presence server 130 may be provided for all of the locations 208a, 208b. In such an embodiment, the central presence server 130 may maintain a table of presence information for each location 208a, 208b under inspection.

Figure 3:
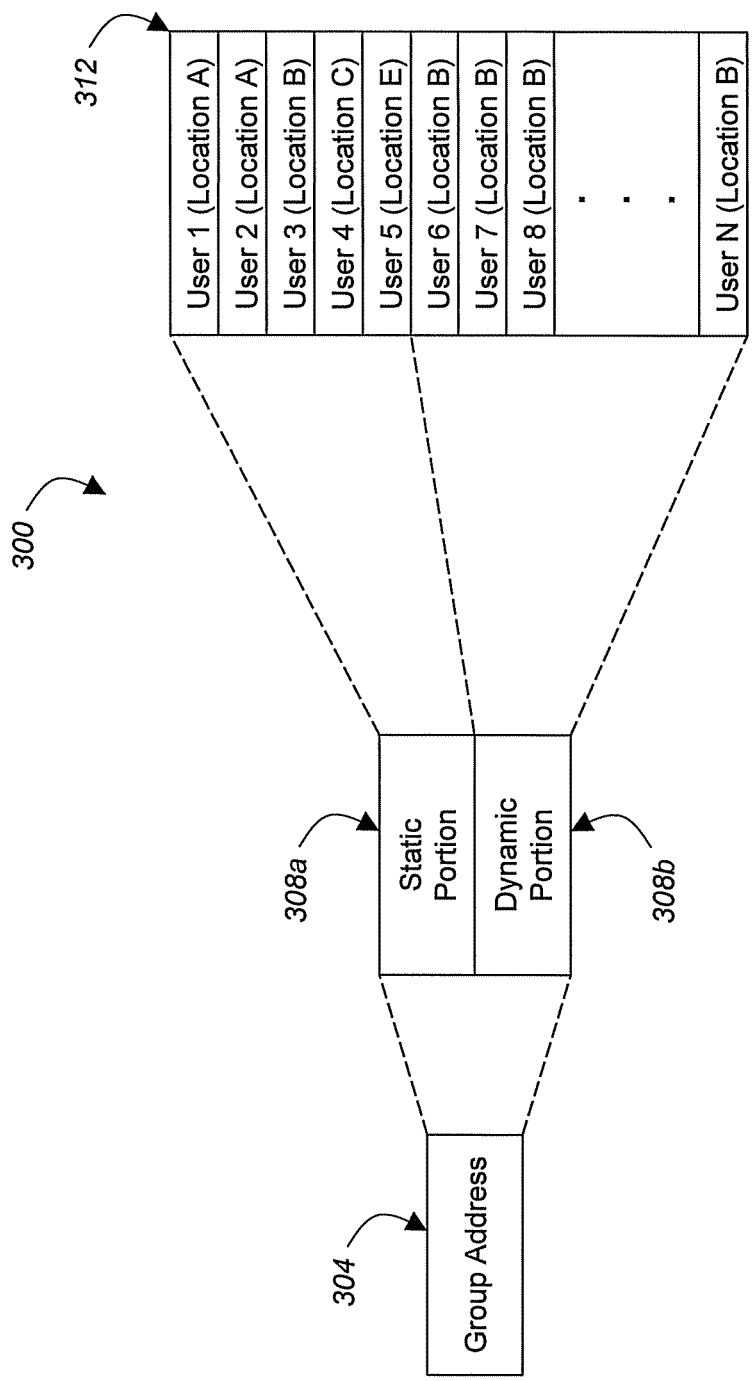
FIG. 3 is a diagram of a data structure employed in accordance with embodiments of the present invention.

With reference now to FIG. 3, a data structure 300 will be described in accordance with at least some embodiments of the present invention. The data structure 300 may correspond to a group address 304 comprising two or more intended recipients 312 of an electronic message. The group address 304 may correspond to a location-specific distribution list for a particular location 208.

The group address 304 may comprise a static portion 308a and a dynamic portion 308b. The static portion 308a may comprise recipients 312 that always are to receive a message addressed to the group address 304. On the other hand, the dynamic portion 308b may be continuously updated with different recipients 312 based on presence information maintained in the presence servers 130a, 130b.

A group address 304 may be composed of only a static portion 308a, only a dynamic portion 308b, or a combination of a static portions 308a and dynamic portions 308b. The group address 304 may also comprise a dynamic portion 308b that is empty due to the fact that the presence of no user 216 has been detected in the targeted location.

In accordance with at least some embodiments of the present invention, the dynamic portion 308b comprises a list of recipients 312 that are to receive a location-specific electronic message. In an alternative configuration, the dynamic portion 308b may comprise a list of recipients that are to be removed from the static portion 308a. For example, the static portion 308a may comprise a list of recipients 312 that are to receive emails for the first location 208a. If the presence of any of those users 216 is detected at a location other than the first location 208a, the dynamic portion 308b may be updated to reflect that the user 216 is not at the first location 208a and should therefore not receive any messages specifically designated for the first location 208a. Whether the dynamic portion 308b is used to affirmatively identify recipients or negatively identify recipients within a particular group address 304, the dynamic portion 308b advantageously allows a group address 304 to be updated with user 216 presence information. This enables group address 304 to be used for the targeted distribution of location-specific electronic messages.

Figure 4:
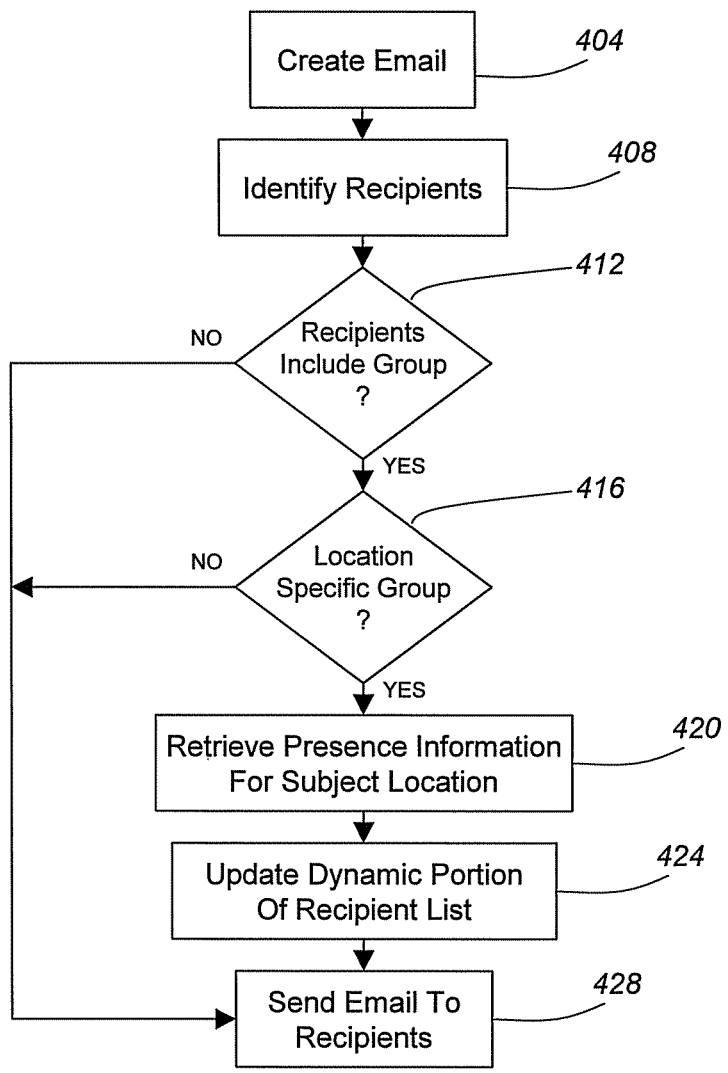
FIG. 4 is a flow diagram depicting a method of sending an electronic message in accordance with embodiments of the present invention.

With reference now to FIG. 4, a method of sending an electronic message will be described in accordance with at least some embodiments of the present invention. The method is initiated when a user creates an electronic message such as an email, text message, SMS message, IM message, or the like (step 404). As a part of creating an electronic message, the sending user is also allowed to identify one or more recipients of the message (step 408). The sending user may identify individual recipients as well as a group of recipients. In accordance with at least some embodiments of the present invention, the group of recipients may be specially created by the sending user or predefined by the email server 114a, 114b or email application 134, 154.

After the recipients of the electronic message have been identified; the message distribution manager 142 determines es if any address defined as a recipient by the sending user includes a group address 304 (step 412). As can be appreciated, a group address 304 may include a plurality of individual recipients and/or other groups addresses 304 (e.g., as a nested set of group addresses 304 where one group address contains recipients identified by their group address rather than being individually identified). In the event that the recipient(s) identified by the sending user does not include a group address 304, then the method continues to step 428 where the email server 114a, 114b sends the electronic message to the identified recipients. More specifically, the email server 114 associated with the same internal network 112 as the sending client device 110 may forward the electronic message to each email server 114 associated with each recipient client device 110, unless the recipient client device 110 is associated with the same internal network 112 as the sending client device 110.

Referring back to step 412, if at least one group address 304 is included in the list of recipients, then the message distribution manager 142 determines if the group address 304 is a location-specific group address 304 (step 416). The message distribution manager 142 may reference the distribution list store 146 to determine if the group address 304 comprises both a static portion 308a and a dynamic portion 308b. If the group address 304 is not location specific, meaning that it only comprises a static portion 308a, then the method continues to step 428.

On the other hand, if the group address 304 is a location-specific group address 304, then the method continues with the message distribution manager 142 retrieving presence information from a presence server 130 for the location associated with the group address 304 (step 420). As can be appreciated, the group address 304 may be associated with more than one location, in which case the message distribution manager 142 may need to retrieve presence information from more than one presence server 130. Alternatively, if the group address 304 is only associated with a single location (e.g., the first location 208a), then the message distribution manager 142 may only need to reference one presence server 130 (e.g., the first presence server 130a or a central presence server). The presence information retrieved from the presence server 130 may include both affirmative and negative presence information (i.e., presence information indicating affirmatively where a user's presence has recently been detected and presence information indicating negatively where the user's presence has not recently been detected).

The message distribution manager 142 may then update the dynamic portion 308b of the group address 304 to reflect the received presence information (step 424). This updating step may be performed each time it is determined that an electronic message is to be sent to a location-specific group address 304. Alternatively, the message distribution manager 142 may have presence information updates transmitted to it from a presence server 130, in which case the distribution list store 146 may be always maintained and immediately referenced prior to sending an electronic message. In the step of updating the dynamic portion 308b of the group address 304, the message distribution manager 142 may also reference user preferences to determine if users identified in the static portion 308a currently want to receive electronic messages addressed to the particular group address 304. More specifically, a user 216 may be going on vacation for two weeks, during which time they do not want to receive location-specific messages, even though they are listed on the static portion 308a. The user 216 may specify in their user preferences that they do not want to include messages addressed to a particular group address 304, in which case they can be temporarily removed from the static portion 308a of the group address 304 (e.g., by either direct removal or by the message distribution manager 142, for example by referencing the calendar of a user 216).

After the dynamic portion 308a of the group address 304 has been updated with presence information, then the message distribution manager 142 sends the message to the individually identified recipients as well as all recipients encompassed within the group address 304.

Figure 5:
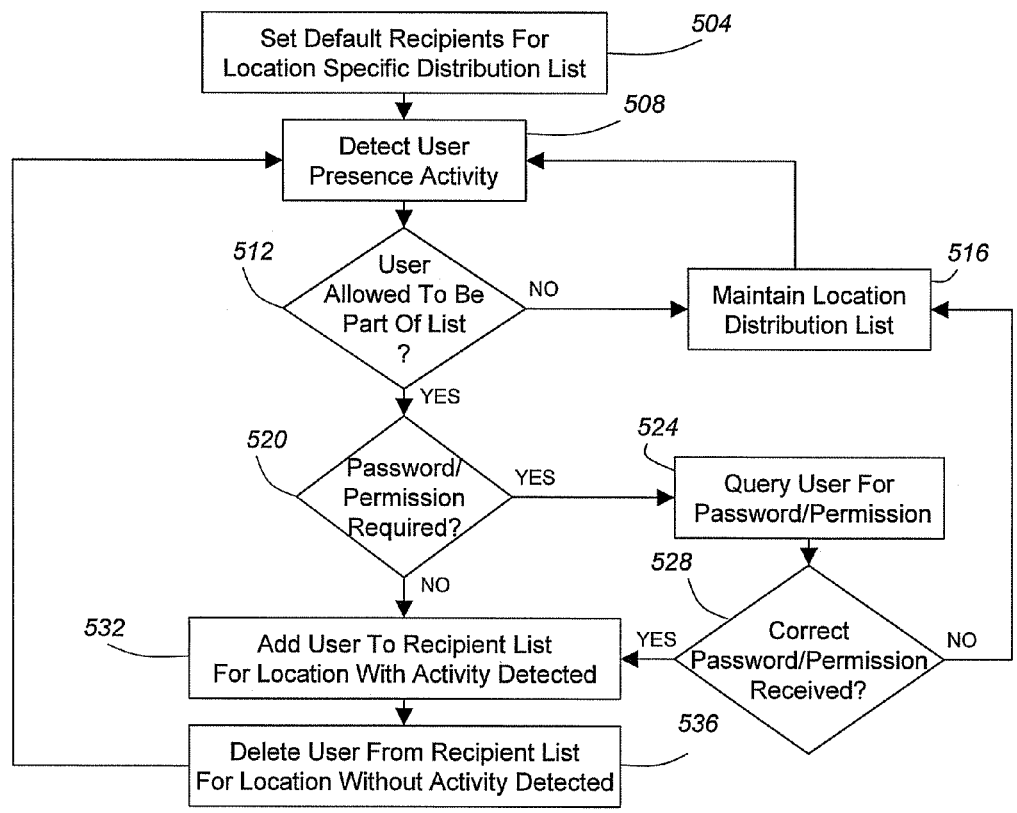
FIG. 5 is a flow diagram depicting a method of dynamically updating a location-specific message distribution list in accordance with embodiments of the present invention.

With reference now to FIG. 5, a method of dynamically updating a location-specific message distribution list or group address 304 in accordance with at least some embodiments of the present invention. The method begins with a system administrator or the like setting default recipients for one or more location-specific distribution lists (step 504). The default settings may be defined by a message system administrator or by each user's message preferences defined in the client email application 154. The default settings (i.e., default recipients) of a location-specific distribution list may be based on the home office of each user within an organization.

Additionally, there may be location-specific distribution lists that are designated for only new employees to a particular location. In such an embodiment, there may not be any default users but rather only default parameters defining a recipient. For example, the default parameters may define that any user detected within a location for a first time should be added to the location-specific distribution list. After a first set of messages are sent to the newly detected user, the user may be removed from the distribution list based on the default parameters.

Once the default recipients have been defined for the location-specific distribution list, the list is stored in the distribution list store 146 and maintained by the email server 114 until presence activity of a user is detected at a location. The method continues once a presence detection device 204 detects the presence activity of at least one user 216 at a location 208 (step 508). When the presence activity of a user 216 is detected, the presence information may be forwarded to the presence server 130 and/or the email server 114.

Upon receiving a notification that presence activity has been detected for a user 216, the message distribution Manager 142 determines if the user 216 is allowed to be a part of any distribution list stored in the distribution list store 146 (step 512). This determination may be made based on whether or not the user 216 is an associate with the organization but is visiting from another location or whether the user 216 is a visitor to the location 208 and is not a part of the organization associated with the location 208. Another condition that may affect whether the user 216 is allowed to be a part of the distribution list is the level of security surrounding the list. For example, the user 216 may comprise a first type of security clearance that allows them to be a part of certain types of distribution lists but not others. If the user 216 is not allowed to be a part of the distribution list, then the method continues by maintaining the location-specific distribution lists as well as other distribution lists in their current form (step 516). More particularly, the message distribution manager 142 will not alter any dynamic portion 308b of any group address 304 maintained in its distribution list store 146. The method then returns to step 508 to wait for the detection of more user 216 presence activity.

Referring back to step 512, if the user 216 is allowed to be a part of the list (e.g., the user 216 is a "visiting associate" or the distribution list is not limited to certain personnel only), then the method continues with the message distribution manager 142 determining whether any group addresses 304 associated with the location 208 where activity was detected require password or security clearance and whether or not the user 216 should be asked for permission before they are automatically added/removed from a group address 304 maintained in the distribution list store 146 (step 520). The determination of whether a user 216 should be asked for permission may be based on the user preferences defined in an email application 134, 154 associated with the user 216. If passwords and/or user 216's permission is required to have their information added/removed from a group address 304, then the message distribution manager 142 prompts the user 216 for a password and/or permission (step 524). In accordance with an alternative embodiment, the message distribution manager 142 may prompt an associate hosting the visiting associate for a password and/or permission. Upon being queried for a password and/or permission, the user 216 provides the requisite password/permission in the client device 110 which then forwards it to the email server 114 (step 528). Part of the permissions that may be received from the user 216 may include an estimated amount of time which the user 216 believes they will be at the location 208 and away from their home location 208. These permissions can be used to automatically restore the default settings for that user with respect to any group address 304 (i.e., location-specific distribution list) that the user 216 is associated with. If the proper password is not received and/or if permission is not granted by the user 216, then the method returns to step 516 where the location distribution list is maintained in its current state.

Conversely, if the message distribution manager 142 receives the proper password and/or permissions from the user 216, then the method continues with the message distribution manager 142 adding the user 216 to the recipient list for the location 208 where the activity was detected (step 532). In other words, the message distribution manager 142 adds the user 216 to the dynamic portion 308b of any group addresses 304 associated with the location 208 where activity was detected. Thereafter, the message distribution manager 142 removes the user 216 from any recipient list for locations 208 other than the one where activity was detected (step 536). In this step, the message distribution manager 142 may notify other message distribution managers 142 via the distributed communication network 122 requesting that the user 216 is removed from any group addresses 304 for that location for a specific period of time. These changes may be maintained until the presence of the user 216 is detected at a new location 208. Alternatively, the changes may be maintained for a predetermined amount of time at which point the default settings of all location-specific distribution lists may be restored with respect to that particular user 216.

The present invention has been primarily described in connection with updating location-specific message distribution lists. In accordance with at least some embodiments of the present invention, a finer grained control of distribution lists can be effected so that electronic messages directed to a specific department or group at a specific location could also be sent to a "visiting associate" if that associate meets certain criteria. For example, a first director of a particular group within an organization may be at a remote location (e.g., non-home location) that is still a part of the organization to attend to various on-site meetings. In accordance with embodiments of the present invention, the first director may be identified as a "visiting associate" at the remote location whereas other directors of the same group that call the same location a home location are not "visiting associates." If any emails are sent to a director of the same group that resides has the subject location as a home location, the message distribution manager 142 may implement a matching algorithm to determine that the first director should also be included in such emails as long as they are at the remote location. The matching algorithm may determine that the first director meets the criteria to be included in a distribution list with the other directors for that location and therefore may send the first director messages addressed to that location.

In accordance with another embodiment of the present invention, a visiting associate may be allowed to review local distribution lists as a part of providing permissions to the message distribution manager 142 and request a subscription to only a subset of those distribution lists for the duration of the associate's visit. If the visiting associate chooses a restricted list, then the list administrator may be given the option to either grant or deny the subscription request.

In accordance with another embodiment of the present invention, an aging algorithm may be employed by the message distribution manager 142 in connection with certain types of presence activity. For example, when a user's 216 presence is detected/registered at a location 208 being visited, mass distribution messages specific to that location for a period of X days previous to the initial registration of the user 216 may also be sent to the visiting associate's message inbox. In other words, a history of messages sent to a particular group address 304 may be maintained and if a user 216 is added to the dynamic portion 308b of the group address 304 within a predetermined amount of time from when the messages were sent, the messages may be retrieved from memory and forwarded to the user 216 whose presence has recently been detected.

In accordance with still other embodiments of the present invention, presence information may be ascertained, either positively or negatively, by the presence server by referencing a calendaring application associated with a particular user. If the user has a particular period of time marked as vacation time, then it may be determined that the user will not be at any work-related location. Alternatively, if the user has a meeting scheduled at a particular location within an organization, the location of that user may be assumed without actually detecting the presence of the user at the location.

Although the above description has been mainly directed toward text-based electronic messages, one skilled in the art will appreciate that aspects of the present invention may also be applied to location-specific voice and/or video messages.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for allowing a conference call participant to be politely joined to the conference call when the conference call is already under way. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, by a processor enabled server, presence information regarding presence activity of a first user in a first location and a second, different location;
determining, by the processor enabled server, that the first location is associated with a first electronic message group having a first electronic message group address, wherein the first electronic message group comprises a static portion and a dynamic portion, wherein the static portion comprises one or more electronic addresses associated with at least one intended recipient, wherein the one or more electronic address in the static portion are not altered;
determining, by the processor enabled server, a first electronic address associated with the first user;
determining, by the processor enabled server, that the first electronic address is not listed in the static portion; and
updating, by the processor enabled server, only the dynamic portion of the first electronic message group with the first electronic address associated with the first user.

2. The method of claim 1, wherein the presence information indicates that the first user is at the first location.

3. The method of claim 2, further comprising updating a dynamic portion of a second electronic message group address, wherein the second electronic message group address is associated with the second location, wherein the first electronic message group address is not associated with the second location, and the second electronic message group address is not associated with the first location.

4. The method of claim 3, wherein updating the dynamic portion of the second electronic message group address comprises removing the first electronic address associated with the first user from the second electronic message group address.

5. The method of claim 1, further comprising:
requesting a password associated with maintaining the first electronic message group address;
receiving a password from the first user;
determining that the password received from the first user equals the password associated with maintaining the first electronic message group address prior to updating the dynamic portion of the first electronic message group address.

6. The method of claim 1, further comprising:
referencing permissions associated with the first user; and
updating the dynamic portion of the first electronic message group address according to the permissions associated with the first user.

7. The method of claim 6, wherein the permissions associated with the first user define an amount of time that the first user would like to have the dynamic portion of the first electronic message group address to be updated.

8. The method of claim 1, further comprising:
receiving a request to send an electronic message to the at least one intended recipient;
determining that the at least one intended recipient includes the first electronic message group address; and
sending the electronic message to the recipients listed in the first electronic message group address.

9. The method of claim 8, further comprising:
maintaining the electronic message in memory for a predetermined amount of time;
determining that the electronic message was sent to the recipients listed in the first electronic group address prior to the dynamic portion of the first electronic message group address being updated;
retrieving the electronic message from memory after the dynamic portion of the first electronic message group address has been updated; and
sending the electronic message to the first user.

10. A tangible, non-transit computer readable storage medium comprising processor executable instructions operable to perform the method of claim 1.

11. The method of claim 1, wherein the first user is associated with the dynamic portion of the first electronic message group address, wherein a second user is associated with the static portion of the first electronic message group address, and wherein both the first and second users are determined to be present at the second location.

12. The method of claim 11, further comprising:
receiving a request to send an electronic message to the first electronic message group address;
sending the electronic message to the second user in response to determining that the second user is associated with the static portion of the first electronic message group address; and
failing to send the electronic message to the first user in response to determining that the first user is associated with the dynamic portion of the first electronic message group address.

13. The method of claim 12, wherein the dynamic portion of the first electronic message group comprises a list of at least one user that may be excluded from the static portion of the first electronic message, and wherein the list of at least one user includes the second user.

14. The method of claim 13, further comprising:
updating the dynamic portion of the first electronic message group in response to determining that the second user is not present at the first location;
receiving a request to send an electronic message to the first electronic message group address; and
failing to send the electronic message to the first and second users.

15. A server, comprising:
a memory;
a processor in communication with the memory, the processor operable to execute a message distribution manager, the message distribution manager operable to:
receive presence information regarding presence activity of a first user in a first location and a second, different location;
determine that the first location is associated with a first electronic message group having a first electronic message group address, wherein the first electronic message group address comprises a static portion and a dynamic portion, wherein the static portion comprises one or more electronic addresses associated with at least one intended recipient, wherein the one or more electronic addresses in the static portion are not altered;
determine a first electronic address associated with the first user;
determine that the first electronic address is not listed in the static portion; and update the dynamic portion of the first electronic message group with the first electronic address associated with the first user.

16. The server of claim 15, wherein the presence information indicates that the first user is at the first location.

17. The server of claim 16, wherein the message distribution manager is further operable to send notification that presence activity of the first user has been detected in the first location to a second message distribution manager associated with a second location such that the second message distribution manager can update a dynamic portion of a second electronic message group address, wherein the second electronic message group address is associated with the second location, wherein the first electronic message group address is not associated with the first location, and the second electronic message group address is not associated with the first location.

18. The server of claim 17, wherein the second message distribution manager is operable to update the dynamic portion of the second electronic message group address comprises removing the address associated with the first user from the second electronic message group address.

19. The server of claim 15, wherein the message distribution manager is further operable to:
request a password associated with maintaining the first electronic message group address;
receive a password from the first user; and
determine that the password received from the first user equals the password associated with maintaining the first electronic message group address prior to updating the dynamic portion of the first electronic message group address.

20. The server of claim 15, wherein the message distribution manager is further operable:
reference permissions associated with the first user; and
update the dynamic portion of the first electronic message group address according to the permissions associated with the first user, and wherein the permissions associated with the first user define an amount of time that the first user would like to have the dynamic portion of the first electronic message group addressed to be updated.

21. The server of claim 15, wherein the message distribution manager is further operable to
receive a request to send an electronic message to the at least one intended recipient;
determine that the at least one intended recipient includes the first electronic group address;
send the electronic message to the recipients listed in the first electronic group address;
maintain the electronic message in the memory for a predetermined amount of time;
determine that the electronic message was sent to the recipients listed in the first electronic group address prior to the dynamic portion of the first electronic message group address being updated;
retrieve the electronic message from the memory after the dynamic portion of the first electronic message group address has been updated; and
send the electronic message to the first user.

22. A communication system, comprising:
a presence device operable to detect presence activity of a first user;
a processor enabled electronic message server comprising:
a distribution list store, wherein the distribution list store comprises at least one group address, wherein the group address comprises a dynamic portion and a static portion; and
a message distribution manager wherein the message distribution manager is operable to:
receive presence information related to the detected presence activity of the first user; and
update the dynamic portion of the at least one group address based on the received presence information.

23. The system of claim 22, wherein the message distribution manager is operable to update the dynamic portion of the first electronic message group address by adding an address associated with the first user to the first electronic message group address.

24. The system of claim 23, wherein the detected presence activity is associated with at least one of a first and second location, wherein the message distribution manager is further operable to send notification that presence activity of the first user has been detected in the first location to a second message distribution manager associated with a second location such that the second message distribution manager can update a dynamic portion of a second electronic message group address, wherein the second electronic message group address is associated with the second location that is different from the first location, wherein the first electronic message group address is not associated with the second location and wherein the second electronic message group address is not associated with the first location.

25. The system of claim 24, wherein the second message distribution manager is operable to update the dynamic portion of the second electronic message group address comprises removing the address associated with the first user from the second electronic message group address.

26. The device of claim 25, wherein the message distribution manager is operable to update the dynamic portion of the first electronic message group address by adding an address associated with the first user to the first electronic message group address.

* * * * *